(12) United States Patent
Shin et al.

(10) Patent No.: US 12,117,857 B2
(45) Date of Patent: Oct. 15, 2024

(54) HEAT PUMP AND METHOD FOR OPERATING HEAT PUMP

(71) Applicant: LG ELECTRONICS INC., Seoul (KR)

(72) Inventors: Youngjoo Shin, Seoul (KR); Ahrae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 719 days.

(21) Appl. No.: 17/213,481

(22) Filed: Mar. 26, 2021

(65) Prior Publication Data
US 2021/0318700 A1    Oct. 14, 2021

(30) Foreign Application Priority Data
Mar. 31, 2020  (KR) ........................ 10-2020-0039210

(51) Int. Cl.
*G05D 7/06* (2006.01)
*F25B 30/02* (2006.01)
*G05B 19/4155* (2006.01)

(52) U.S. Cl.
CPC .......... *G05D 7/0676* (2013.01); *F25B 30/02* (2013.01); *G05B 19/4155* (2013.01); *F25B 2600/13* (2013.01); *F25B 2700/15* (2013.01); *G05B 2219/37371* (2013.01)

(58) Field of Classification Search
None
See application file for complete search history.

(56) References Cited

U.S. PATENT DOCUMENTS

| | | | | |
|---|---|---|---|---|
| 2009/0068034 A1* | 3/2009 | Cook | ............... | F04B 1/0413 417/410.1 |
| 2015/0240801 A1* | 8/2015 | Marioni | ............... | F04B 49/065 700/282 |
| 2016/0202682 A1* | 7/2016 | Matsumoto | ............... | H02J 7/35 700/291 |

FOREIGN PATENT DOCUMENTS

| | | |
|---|---|---|
| CN | 101101164 | 1/2008 |
| CN | 101140096 | 3/2008 |
| CN | 101384858 | 3/2009 |
| CN | 201652653 | 11/2010 |
| CN | 202041227 | 11/2011 |

(Continued)

OTHER PUBLICATIONS

Electrical Engineering Stack Exchange, "How to sense current being used by motors", https://electronics.stackexchange.com/questions/99656/how-to-sense-current-being-used-by-motors, Feb. 2014, pp. 1-3 (Year: 2014).*

(Continued)

*Primary Examiner* — David Earl Ogg
(74) *Attorney, Agent, or Firm* — KED & ASSOCIATES

(57) ABSTRACT

A heat pump and a method for operating a heat pump are provided. The heat pump may include a compressor that compresses a refrigerant, at least one fluid-refrigerant heat exchanger that exchanges heat between the refrigerant and a fluid, such as water, a pump including a motor, the pump forcing the fluid to flow into the at least one fluid-refrigerant heat exchanger, and a controller. The controller may be configured to calculate power consumption of the pump, calculate a flow rate of fluid flowing due to the pump based on the power consumption of the pump, and control an operation of the pump to be stopped when the flow rate of the fluid is less than a predetermined reference flow rate.

18 Claims, 10 Drawing Sheets

(56) References Cited

FOREIGN PATENT DOCUMENTS

| | | |
|---|---|---|
| CN | 105511272 | 4/2016 |
| CN | 105673474 | 6/2016 |
| CN | 105987486 | 10/2016 |
| CN | 105987486 A * | 10/2016 |
| CN | 107543345 | 1/2018 |
| CN | 108223138 | 6/2018 |
| CN | 109059216 | 12/2018 |
| DE | 32 15 582 | 10/1983 |
| DE | 44 23 736 | 1/1995 |
| DE | 101 16 339 | 10/2002 |
| JP | S61-62820 | 3/1986 |
| JP | H11-211270 | 8/1999 |
| JP | 2005-030888 | 2/2005 |
| JP | 2005-257221 | 9/2005 |
| JP | 2006-220022 | 8/2006 |
| JP | 2011247564 A * | 12/2011 |
| JP | 2017-129340 | 7/2017 |
| KR | 10-2016-0087576 | 7/2016 |
| KR | 20190115209 A * | 10/2019 |
| WO | WO 2010/020160 | 2/2010 |
| WO | WO-2013051642 A1 * | 4/2013 .......... F24D 11/0221 |

OTHER PUBLICATIONS

Hackaday, "How current shunts work", https://hackaday.com/2018/02/08/how-current-shunts-work/, Feb. 2018, pp. 1-2 (Year: 2018).*
German Office Action issued in Application No. 102021107893.8 dated Nov. 10, 2021.
Chinese Office Action dated Jun. 1, 2022 issued in Application No. 202110334811.5 (English translation attached).

* cited by examiner

HEAT PUMP AND METHOD FOR OPERATING HEAT PUMP

CROSS-REFERENCE TO RELATED APPLICATION(S)

This application claims the priority benefit of Korean Patent Application No. 10-2020-0039210, filed in Korea on Mar. 31, 2020 in the Korean Intellectual Property Office, the disclosure of which is incorporated herein by reference.

BACKGROUND

1. Field

A heat pump and a method for operating a heat pump are disclosed herein.

2. Background

Heat pumps refer to devices that transmit thermal energy from a low-temperature heat source to a high-temperature space or transmit thermal energy from a high-temperature heat source to a low-temperature space using evaporation heat or condensation heat of a refrigerant, and generally includes an outdoor unit including a compressor and an outdoor heat exchanger, and an indoor unit including an indoor heat exchanger. In addition, the heat pump may heat a fluid, such as water through heat exchange of refrigerant to be used for increasing the indoor temperature or supplying hot water to a user, which makes it possible to replace the use of fossil fuels.

In general, the heat pump has a water pump that pumps water circulating in a cooling system or a heating system, where the water pumped by the water pump is heat-exchanged with refrigerant and then supplied back to the cooling system or heating system. The water pump includes at least one impeller, and a motor that rotates the impeller, for example.

On the other hand, while the water pump is operating according to pre-designed rated conditions, when a flow rate of water decreases below a certain level due to a cause, such as foreign substances clogging the pipe, efficiency of the water pump may decrease or surging, for example. In addition, when solubility of gas decreases due to an increase in water temperature, or when a proportion of air flowing through the pipe increases due to air flowing into the pipe during adding of the water, a water hammer, or surging, for example, corrosion of the pipe may be accelerated by oxygen.

In this way, when the cooling system or the heating system is configured to use water, it is necessary to continuously sense the flow rate of water flowing through the pipe or a ratio of water to air and control each component provided in the heat pump according to the sensed result. However, in the related art, in order to sense the flow rate of water, as in Korean Patent Laid-Open No. 10-2016-0087576 (hereinafter "Patent Document 1"), which is hereby incorporated by reference, a separate sensor, such as a float switch, is provided, which may result in an increase in cost, and even when such a sensor is provided, it is difficult to detect a proportion of air flowing through the pipe.

BRIEF DESCRIPTION OF THE DRAWINGS

Embodiments will be described in detail with reference to the following drawings in which like reference numerals refer to like elements, and wherein.

DETAILED DESCRIPTION

Figure 1:
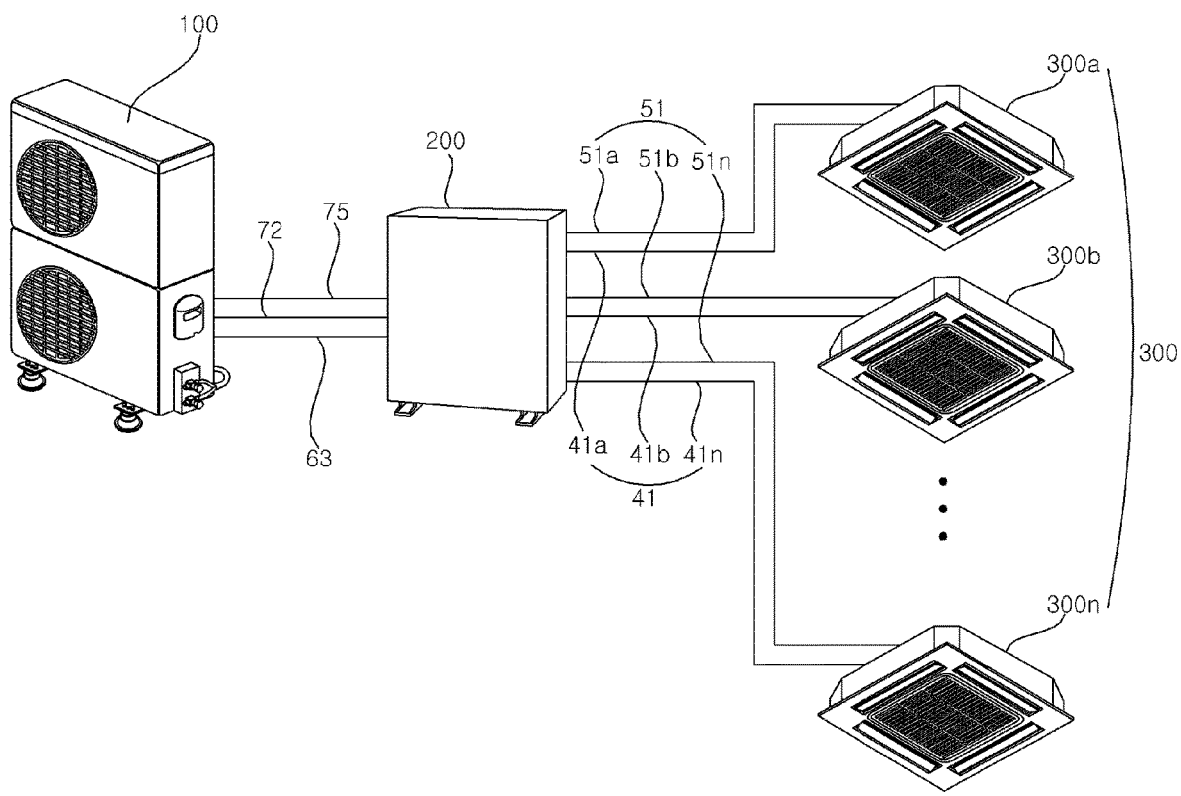
FIG. 1 is a schematic diagram of a heat pump according to an embodiment.

Advantages and features of embodiments, and a method for achieving them will be apparent with reference to embodiments described hereinafter together with the accompanying drawings. However, the embodiments are not limited to the embodiments disclosed hereinafter, but may be implemented in a variety of different forms, the embodiments are provided to only complete disclosure, and to allow a person of ordinary skill in the technical field to which the embodiments belongs to understand the scope, and the embodiments are only defined by the scope of the claims. The same reference numerals will be used to refer to the same or similar elements throughout.

Spatially relative terms such as "below", "beneath", "lower", "above", "upper", or the like, can be used to easily describe the correlation between one component and another component, as shown in the drawing. Spatially relative terms should be understood as terms including different directions of components in use or operation in addition to the direction shown in the drawings. For example, when inverting elements shown in a drawing, an element described as "below" or "beneath" of another element will be placed "above" the other element. Accordingly, the exemplary term "below" may encompass both directions below and above. An element may be oriented in other directions as well, and thus spatially relative terms may be interpreted according to the orientation.

The terms used hereinafter are used to describe embodiments and are not intended to limit embodiments. Hereinafter, the terms of a singular form may include plurals form unless otherwise specified. As used, the terms "comprises" and/or "comprising" specify the presence of stated components, steps, and/or operations, but do not exclude the presence or addition of one or more other components, steps and/or operations.

Unless otherwise defined, all terms (including technical and scientific terms) used are intended to have the meanings commonly understood by those of ordinary skill in the art to which the embodiments belongs. In addition, terms such as those defined in commonly used dictionaries should not be interpreted in an idealized or overly formal sense unless expressly defined otherwise.

In the drawings, the thickness or size of each element is exaggerated, omitted, or schematically illustrated for convenience and clarity of description. Furthermore, the size and area of each element do not fully reflect the actual size or area.

It is to be noted that the suffixes of elements used in the following description, such as a "module" and a "unit", are assigned or interchangeable with each other by taking into consideration only the ease of writing this specification, but in themselves are not particularly given distinct meanings and roles.

In this case, it will be appreciated that each block of the process flowchart drawings and combinations of the flowchart drawings may be executed by computer program instructions. As the computer program instructions may be installed on the processor of a general-purpose computer, special purpose computer or other programmable data processing equipment, the instructions executed by the processor of the computer or other programmable data processing equipment generates means for performing the functions described in the flowchart block(s). The computer program instructions can also be stored in a computer-usable or computer-readable memory that can direct a computer or other programmable data processing equipment to implement a function in a particular manner, and thus the instructions stored in the computer-usable or computer-readable memory can produce an article of manufacture containing instruction means for performing the functions described in the flowchart block(s). The computer program instructions can also be installed on a computer or other programmable data processing equipment to cause the computer or the other programmable data processing equipment to execute a series of operational steps on the computer or the other programmable data processing equipment to create a computer-executable process, and thus the instructions for operating the computer or other programmable data processing equipment can provide steps for performing the functions described in the flowchart block(s).

Furthermore, each block may represent a portion of a module, a segment, or a code, which includes one or more executable instructions for performing a specified logical function(s). It should also be noted that in some alternative implementations, the functions noted in the blocks may occur out of order. For example, two blocks shown in succession may in fact be performed substantially concurrently or the blocks may sometimes be performed in the reverse order, depending on the functionality involved.

In addition, terms such as first and second may be used to describe various elements, but these elements are not limited by these terms. These terms are only used to distinguish one element from another.

FIG. 1 is a schematic diagram of a heat pump according to an embodiment. Referring to FIG. 1, a heat pump 10 may include an outdoor unit 100, a hybrid unit 200, and/or an indoor unit 300.

The outdoor unit 100 may compress a refrigerant. The outdoor unit 100 may compress a refrigerant to discharge a high-temperature and high-pressure gaseous refrigerant, or may discharge a liquid refrigerant.

The outdoor unit 100 may be connected to the hybrid unit 200 through a plurality of pipes 63, 72, and 75. For example, the outdoor unit 100 may supply high-temperature, high-pressure gaseous refrigerant to the hybrid unit 200 through high-pressure gas pipe 63, and may receive low-pressure gaseous refrigerant from the hybrid unit 200 through low-pressure gas pipe 75. For example, the outdoor unit 100 may supply liquid refrigerant to the hybrid unit 200 through liquid pipe 72 or may receive it from the hybrid unit 200.

The hybrid unit 200 may operate to cause heat exchange between the refrigerant supplied from the outdoor unit 100 and a fluid, such as water supplied from the indoor unit 300. For example, the hybrid unit 200 may increase the temperature of the fluid supplied from the indoor unit 300 using high-temperature, high-pressure refrigerant supplied from the outdoor unit 100, and transfer hot fluid to the indoor unit 300. For example, the hybrid unit 200 may decrease the temperature of the fluid supplied from the indoor unit 300 using liquid refrigerant supplied from the outdoor unit 100, and transfer cold fluid to the indoor unit 300.

The indoor unit 300 may be connected to the hybrid unit 200 through a plurality of pipes 41 and 51. For example, the indoor unit 300 may receive fluid from the hybrid unit 200 through an inlet pipe 41, and may transfer fluid to the hybrid unit 200 through a discharge pipe 51.

The indoor unit 300 may operate to cause heat exchange between fluid supplied from the hybrid unit 200 and indoor air. For example, when hot fluid is supplied from the hybrid unit 200, the indoor unit 300 may provide a heating function by discharging air heat-exchanged with the hot fluid. For example, when cold fluid is supplied from the hybrid unit 200, the indoor unit 300 may provide a cooling function by discharging air heat-exchanged with the cold fluid.

In the drawing, the indoor unit 300 is illustrated as a ceiling type indoor unit; however, embodiments are not limited thereto, and various types of indoor units, such as a stand type, a wall-mounted type, and a ceiling type are applicable.

The heat pump 10 may include a plurality of indoor units 300a to 300n, and the plurality of indoor units 300a to 300n may be connected to the hybrid unit 200. In the drawing, the hybrid unit 200 and the plurality of indoor units 300a to 300n are illustrated as being connected through separate pipes; however, embodiments are not limited thereto, and a pipe connected to the hybrid unit 200 may be branched and connected to each of the plurality of indoor units 300a to 300n.

The outdoor unit 100, the hybrid unit 200, and/or the indoor unit 300 may be connected by a communication line to transmit and receive data to one another, and may be connected to a central controller (not shown) by wire or wirelessly to be operated under the control of the central controller.

The indoor unit 300 may be connected to a remote controller (not shown), and may receive a user's control command through the remote controller. For example, the user may use the remote controller to control power on/off of the indoor unit 300 and to change an operation mode or a set temperature of the indoor unit 300. In this case, the indoor unit 300 may communicate with the remote controller by wire or wirelessly based on the connection type.

Figure 2:
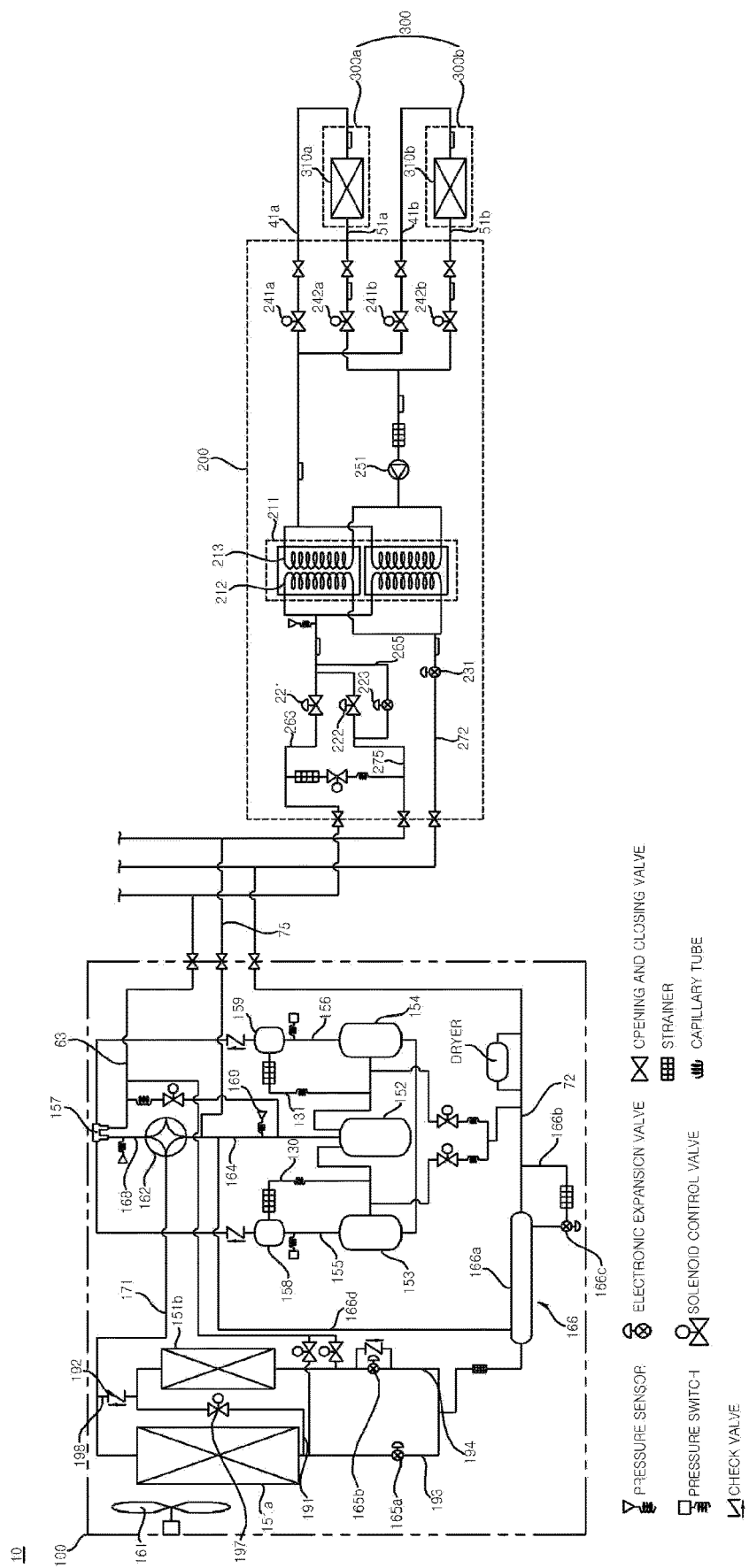
FIG. 2 is a schematic diagram of an outdoor unit, a hybrid unit, and an indoor unit according to an embodiment.

FIG. 2 is a schematic diagram of the outdoor unit, the hybrid unit, and the indoor unit of FIG. 1 according to an embodiment. Referring to FIG. 2, the outdoor unit 100 may include compressors 153 and 154 that compress the refrigerant, outdoor heat exchangers 151a and 151b that dissipate the compressed refrigerant, an accumulator 152 that temporarily stores the gasified refrigerant to remove moisture and foreign matter, and then supplies refrigerant having a constant pressure to the compressors 153 and 154, a cooling/heating switching valve 162 that switches flow paths of the compressed refrigerant, oil separators 158 and 159, an outdoor fan 161 disposed on one side of the outdoor heat exchangers 151a and 151b to promote heat dissipation of the refrigerant, and at least one expansion mechanism, for example, an electronic expansion valve (EV)) that expands the condensed refrigerant.

The compressors 153 and 154 may include at least one of an inverter compressor or a constant speed compressor. For example, first compressor 153 may be an inverter compressor capable of varying a compression capacity of the refrigerant, and second compressor 154 may be a constant speed compressor having a constant compression capacity of the refrigerant.

Discharge units of the compressors 153 and 154 may be connected to first and second discharge pipes 155 and 156, respectively, and the first and second discharge pipes 155 and 156 may be connected to a branch joint 157. The oil separators 158 and 159 that recover oil from the refrigerant discharged from the compressors 155 and 154 may be provided in the first and second discharge pipes 155 and 156, respectively, and the oil separators 158 and 159 may be connected to the oil recovery pipes 130 and 131 that guide the oil separated by the oil separators 158 and 159 to the compressors 153 and 154, respectively.

A suction pipe 164 may be connected to the accumulator 151, and a suction pressure sensor 169 may be disposed at the suction pipe 164. The suction pressure sensor 169 may sense a suction pressure of the refrigerant flowing into the compressors 153 and 154, and a suction pressure value may be transmitted to a controller (550 in FIG. 5).

The branch joint 157 may be connected to the high-pressure gas pipe 63 through which the refrigerant discharged from the compressors 153 and 154 may be bypassed without passing through four-way valve 162. The branch joint 157 may be connected to the four-way valve 162 through a third discharge pipe 168.

The outdoor heat exchangers 151*a* and 151*b* may exchange heat between outdoor air and refrigerant. The outdoor heat exchangers 151*a* and 151*b* may operate as a condenser during a cooling operation and as an evaporator during a heating operation.

The outdoor heat exchangers 151*a* and 151*b* may be connected to the four-way valve 162 by a first connection pipe 171. In order to facilitate heat exchange in the outdoor heat exchangers 151*a* and 151*b*, the outdoor fan 161 may be disposed on one side of the outdoor heat exchangers 151*a* and 151*b*.

First outdoor heat exchanger 151*a* may be connected to a first bypass pipe 191 and a first distribution pipe 193. The first connection pipe 171 and a first bypass pipe 191 may be connected by a second bypass pipe 198. Second outdoor heat exchanger 151*b* may be connected to the first bypass pipe 191 and a second distribution pipe 194 that joins the first distribution pipe 193.

One or a first end of the first connection pipe 171 may be connected to the four-way valve 162, and the other or a second end of the first connection pipe 171 may be connected to the first heat exchanger 151*a* and the second bypass pipe 198. In the first distribution pipe 193, a first outdoor expansion valve 165*a* that controls an opening degree of the first distribution pipe 193 may be disposed. For example, under the control of the controller 551, the first outdoor expansion valve 165*a* may throttle, bypass, or block the refrigerant passing through the first distribution pipe 193.

In the first bypass pipe 191, a first on/off valve 197 that is opened and closed to control the flow of the refrigerant may be disposed. For example, when the first on/off valve 197 is opened, the refrigerant may be transferred from the first outdoor heat exchanger 151*a* to the second outdoor heat exchanger 151*b*. In the drawing, the first bypass pipe 191 is illustrated as being branched from the first distribution pipe 193 and being connected to the second outdoor heat exchanger 151*b*; however, embodiments are not limited thereto.

In the second bypass pipe 198, a first check valve 192 may be disposed. The first check valve 192 may prevent the refrigerant from flowing from the first connection pipe 171 to the first bypass pipe 191.

In the second distribution pipe 194, a second outdoor expansion valve 165*b* that controls an opening degree of the second distribution pipe 194 may be disposed. For example, under the control of the controller 551, the second outdoor expansion valve 165*b* may throttle, bypass, or block the refrigerant passing through the second distribution pipe 194.

A supercooling device 166 may cool the refrigerant transferred to the hybrid unit 200. The supercooling device 166 may include a supercooling heat exchanger 166*a*, a supercooling bypass pipe 166*b* bypassed from the liquid pipe 72 and connected to the supercooling heat exchanger 166*a*, a supercooling expansion valve 166*c* disposed in the supercooling bypass pipe 166*b* and selectively expanding the refrigerant, and/or a recovery pipe 166*d* that connects the supercooling heat exchanger 166*a* to the third discharge pipe 168.

The hybrid unit 200 may include a fluid-refrigerant heat exchanger 211 for exchange heat between a fluid, such as water and the refrigerant supplied from the outdoor unit 100. The fluid-refrigerant heat exchanger 211 may be a double tube heat exchanger in which a refrigerant flow path 212 through which a refrigerant flows and a fluid flow path 213 through which a fluid, such as water flows are formed inside/outside with a heat transfer member interposed therebetween, or may be a plate heat exchanger in which the refrigerant flow path 212 and the fluid flow path 213 are alternately formed with the heat transfer member interposed therebetween. Hereinafter, a case where the fluid-refrigerant heat exchanger 211 is a plate heat exchanger will be described as an example.

The refrigerant flow path 212 of the fluid-refrigerant heat exchanger 211 may be connected to a high-pressure gaseous refrigerant flow path 263 through which a high-temperature, high-pressure gaseous refrigerant flows, a low-pressure gaseous refrigerant flow path 275 through which a low-pressure gaseous refrigerant flows, and/or a liquid refrigerant flow path 272 through which a liquid refrigerant flows.

The hybrid unit 200 may include a high-pressure gas valve 221 disposed in the high-pressure gaseous refrigerant flow path 263 and controlling an opening degree of the high-pressure gaseous refrigerant flow path 263. For example, when the operation mode of the indoor unit 300 connected to the fluid-refrigerant heat exchanger 211 is a heating mode, the high-pressure gas valve 221 is turned on and the refrigerant flowing through the high-pressure gaseous refrigerant flow path 263 may be transferred to the refrigerant flow path 212.

The hybrid unit 200 may include a low-pressure gas valve 222 disposed in the low-pressure gaseous refrigerant flow path 275 and controlling an opening degree of the low-pressure gaseous refrigerant flow path 275. For example, when the operation mode of the indoor unit 300 connected to the fluid-refrigerant heat exchanger 211 is a cooling mode, the low-pressure gaseous refrigerant flow path 275 is opened and the refrigerant discharged from the refrigerant flow path 212 may flow to the low-pressure gaseous refrigerant flow path 275.

The hybrid unit 200 may include a refrigerant control valve 231 disposed in the liquid refrigerant flow path 272 and controlling an amount of refrigerant flowing through the refrigerant flow path 212. The refrigerant control valve 231 may be an electronic expansion valve (EEV), for example, and an opening degree may be controlled according to an input pulse value. For example, when the pulse input to the refrigerant control valve 231 decreases by 50%, the opening degree of the refrigerant control valve 231 may also be decreased by 50%.

The hybrid unit 200 may further include a flat pressure valve 223 that operates so that an internal pressure of the fluid-refrigerant heat exchanger 211 achieves a flat pressure. The hybrid unit 200 may further include a pump 251 that pumps fluid circulating through the fluid flow path 213. For example, the pump 251 may be disposed in a pipe through which fluid supplied from the indoor unit 300 flows and may operate so that fluid discharged from the indoor unit 300 flows to the fluid-refrigerant heat exchanger 211.

The hybrid unit 200 may include supply valves 241a and 241b disposed in inlet pipes 41a and 41b through which fluid supplied to each of the plurality of indoor units 300 flows, and control an opening degree of the inlet pipes 41a and 41b. The hybrid unit 200 may include discharge valves 242a and 242b disposed in discharge pipes 51a and 51b through which fluid supplied from each of the plurality of indoor units 300 flows, and control an opening degree of the discharge pipes 51a and 51b.

In the drawing, the supply valves 241a and 241b and the discharge valves 242a and 242b are illustrated as being provided in the hybrid unit 200; however, embodiments are not limited thereto, and they may be provided in the indoor unit 300, or may be separately disposed between the hybrid unit 200 and the indoor unit 300.

The indoor units 300a and 300b may include indoor heat exchangers 310a and 310b, an indoor fan (not shown), and a plurality of sensors (not shown). The indoor heat exchangers 310a and 310b may exchange heat between cold fluid or hot fluid supplied from the hybrid unit 200 and air. The indoor fan may discharge air heat-exchanged by the indoor heat exchangers 310a and 310b indoors through rotation.

Figure 3:
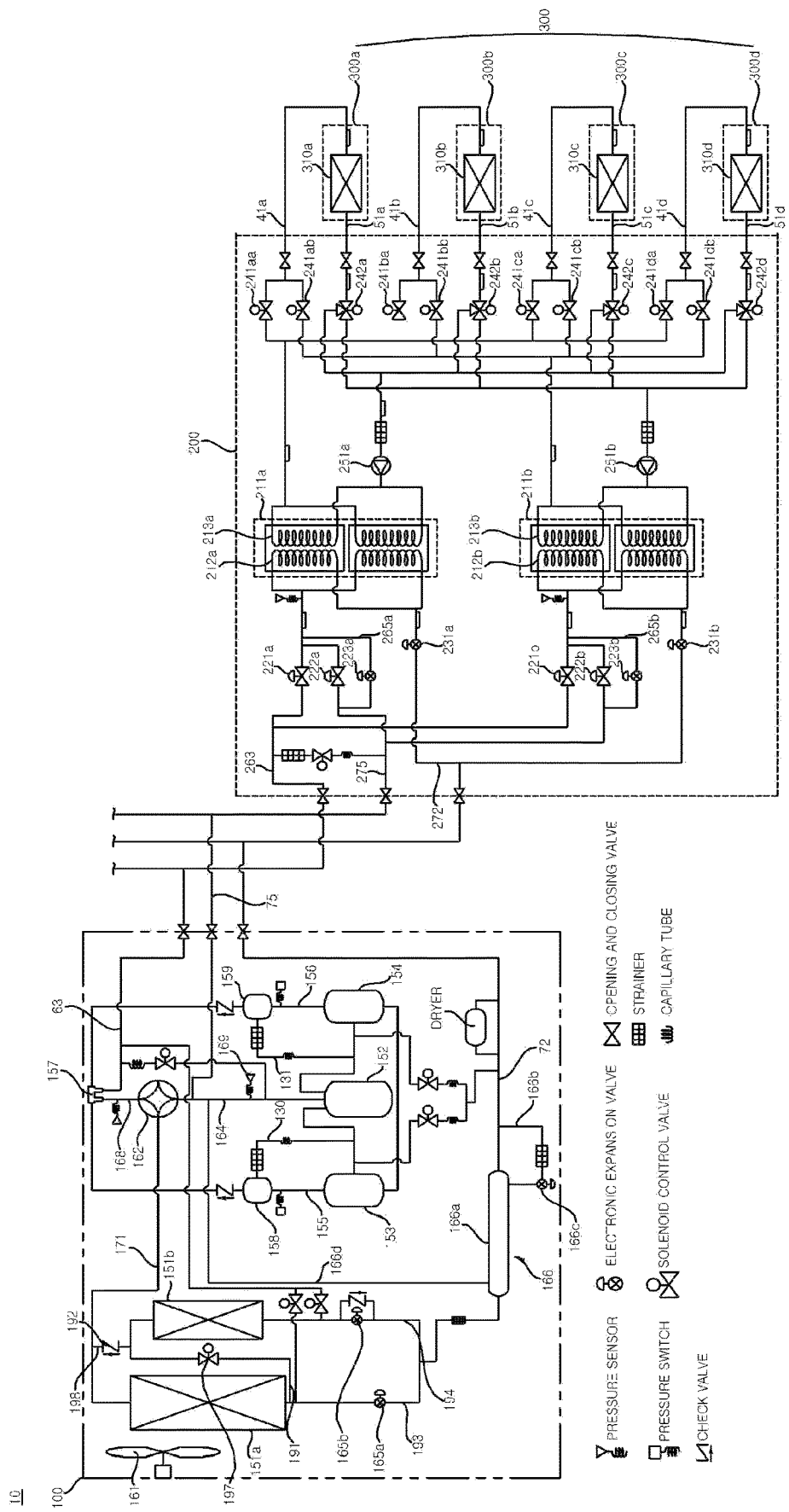
FIG. 3 is a schematic diagram of an outdoor unit, a hybrid unit, and an indoor unit according to another embodiment.

FIG. 3 is a schematic diagram of the outdoor unit, the hybrid unit, and the indoor unit of FIG. 1 according to another embodiment. Description of the same components as those described in FIG. 2 has been omitted.

Referring to FIG. 3, the hybrid unit 200 may include a plurality of fluid-refrigerant heat exchangers 211a and 211b. In the drawing, the hybrid unit 200 is shown to include two fluid-refrigerant heat exchangers 211a and 211b; however, embodiments are not limited thereto, and three or more may be provided.

The hybrid unit 200 may include a plurality of high-pressure gas valves 221a and 221b, low-pressure gas valves 222a and 222b, flat pressure valves 223a and 223b, refrigerant control valves 231a and 231b, and/or pumps 251a and 251b, respectively, corresponding to the number of a plurality of fluid-refrigerant heat exchangers 211a and 211b. Further, the hybrid unit 200 may include a plurality of supply valves 241aa to 241db and discharge valves 242a to 242d, respectively, corresponding to the number of the plurality of fluid-refrigerant heat exchangers 211a and 211b and the plurality of indoor units 300. In the drawing, the discharge valves 242a to 242d are illustrated as being three-way valves; however, embodiments are not limited thereto.

The plurality of indoor units 300 may be connected to the plurality of fluid-refrigerant heat exchangers 211a and 211b, respectively, through inlet pipes 41a to 41d and discharge pipes 51a to 51d, and may receive fluid from any one of the plurality of fluid-refrigerant heat exchangers 211a and 211b according to the operation mode. In this regard, a description will be given with reference to FIGS. 4A to 4C.

Figure 4A:
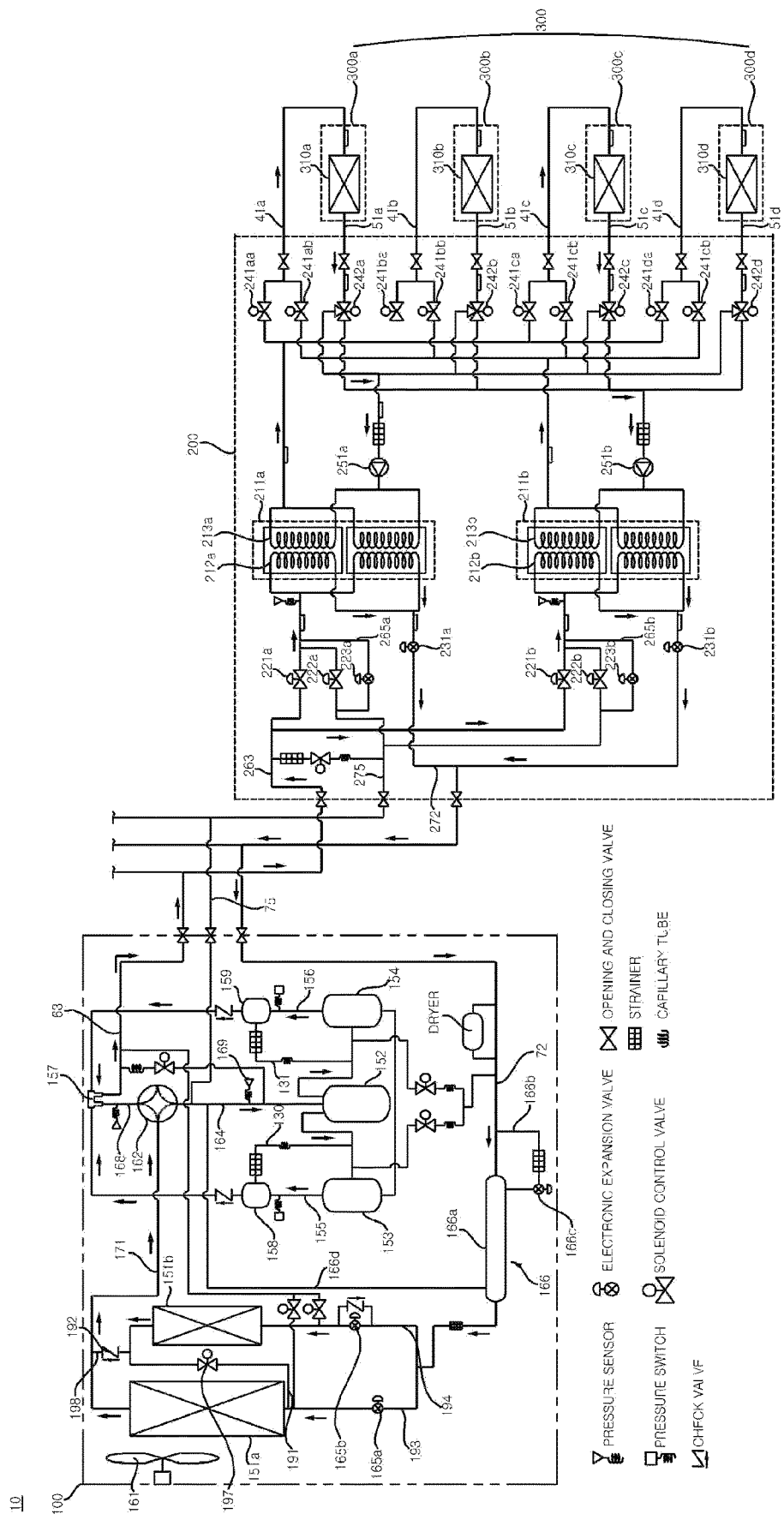
FIGS. 4A to 4C are diagrams illustrating an operation state of a heat pump depending on an operation state of a plurality of indoor units.
Figure 4B:
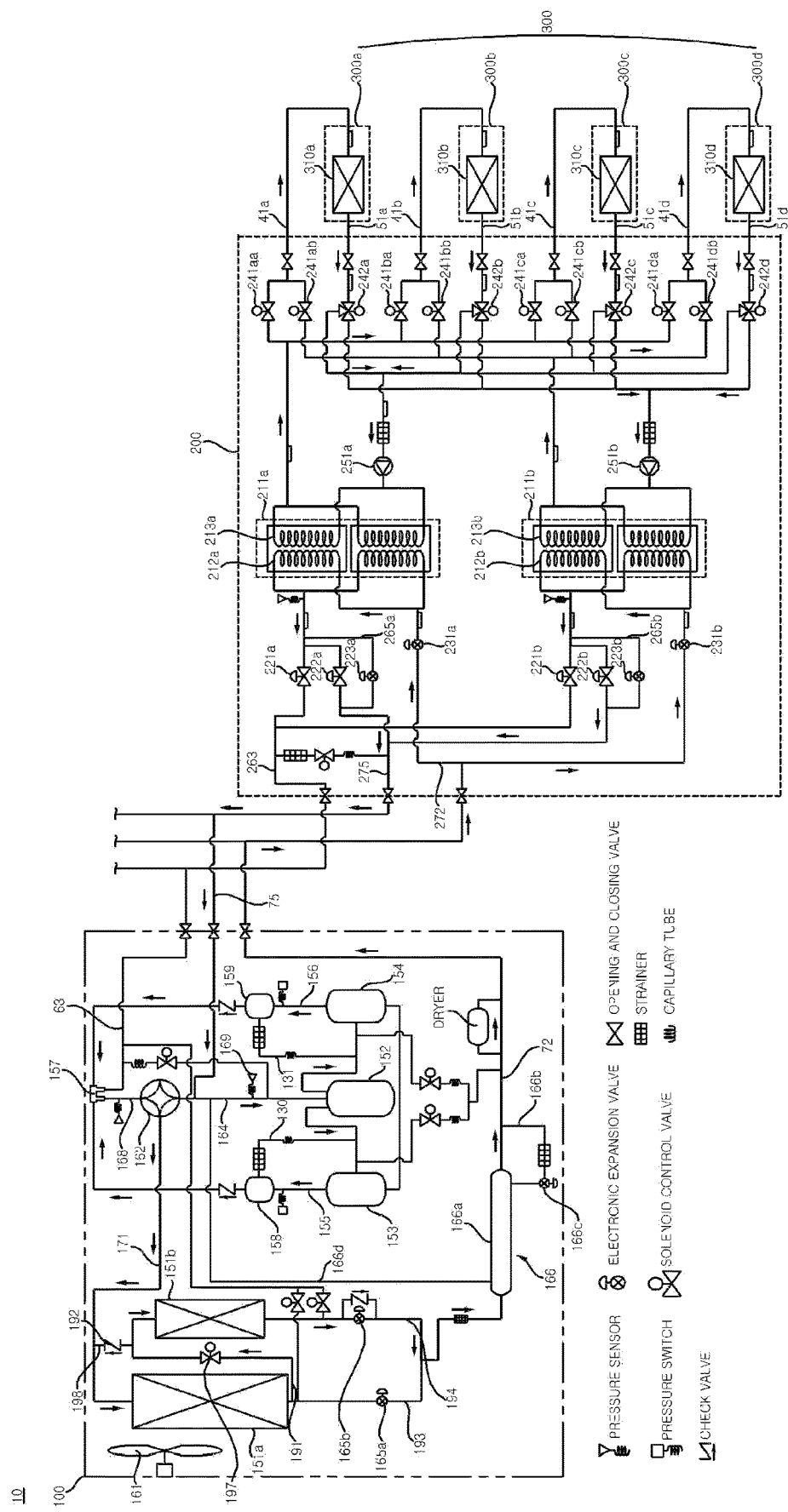
Figure 4C:
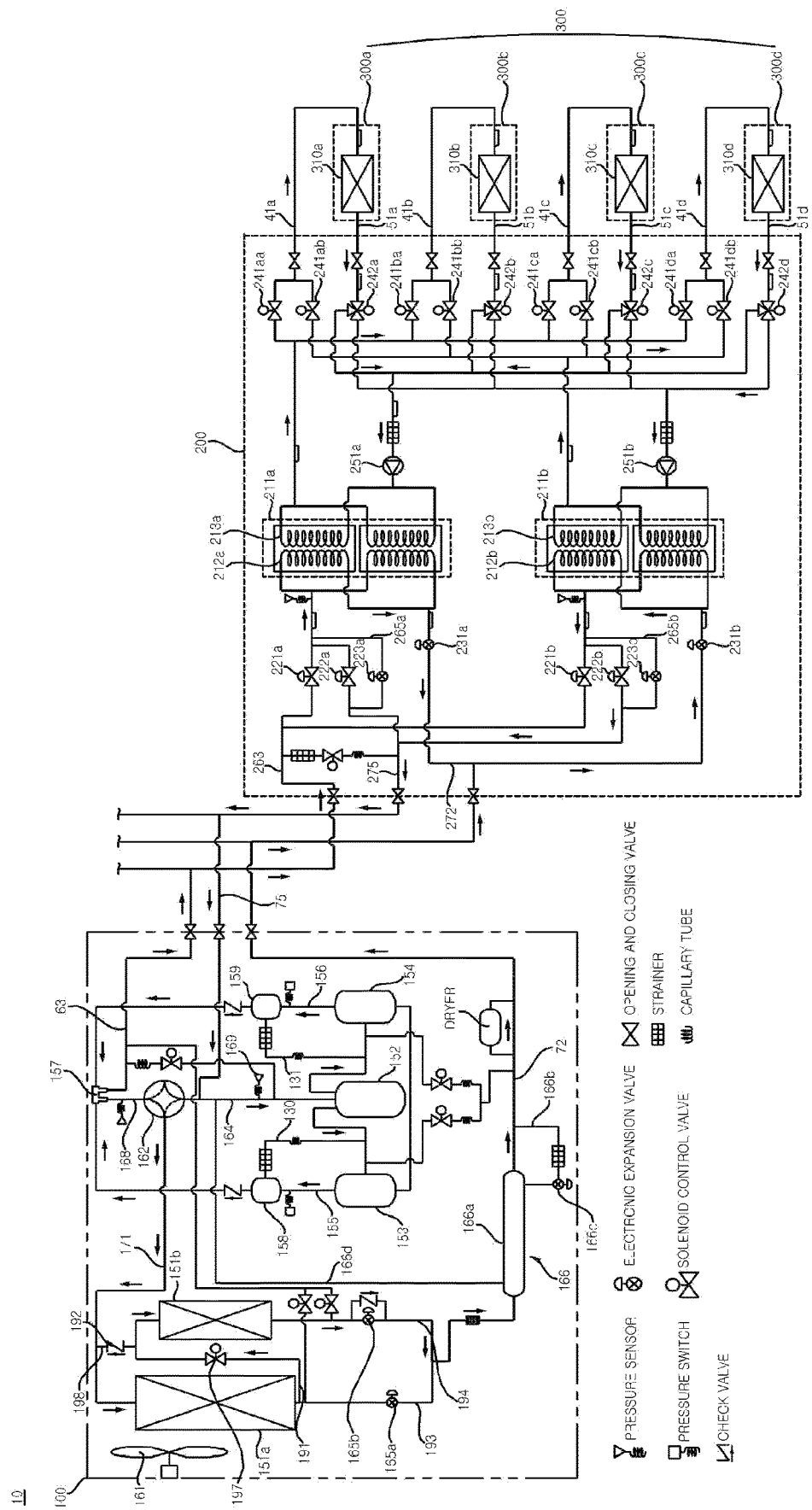

FIGS. 4A to 4C are diagrams illustrating an operation state of a heat pump depending on an operation state of a plurality of indoor units. FIG. 4A illustrates an operation state of each component when, among the plurality of indoor units 300, the operation modes of first and third indoor units 300a and 300c are set to a heating mode and second and fourth indoor units 300b and 300d are powered off and the operation mode of the heat pump 10 is set to the heating mode.

Referring to FIG. 4A, in the heat pump 10, the indoor unit 300 connected to each of the plurality of fluid-refrigerant heat exchangers 211a and 211b may be determined, in consideration of operation loads of the plurality of indoor units 300. For example, when only the first and third indoor units 300a and 300c are powered on among the plurality of indoor units 300, the first indoor unit 300a may be connected to the first fluid-refrigerant heat exchanger 211a, and the second indoor unit 300b may be connected to the second fluid-refrigerant heat exchanger 211b. In addition, depending on a connection relationship between the plurality of fluid-refrigerant heat exchangers 211a and 211b and the plurality of indoor units 300, opening and closing of the supply valves 241aa to 241db and the discharge valves 242a to 242d may be determined.

When the operation mode of the heat pump 10 is set to the heating mode, the high-temperature, high-pressure gaseous refrigerant compressed and discharged by the compressors 153 and 154 may flow to the high-pressure gas pipe 63 through the first and second discharge pipes 155 and 156 and the branch joint 157, and may be supplied to the hybrid unit 200 through the high-pressure gas pipe 63. In addition, by opening the high-pressure gas valves 221a and 221b of the hybrid unit 200, the high-temperature, high-pressure gaseous refrigerant supplied from the outdoor unit 100 may be transferred to refrigerant flow paths 212a and 212b of the plurality of fluid-refrigerant heat exchangers 211a and 211b.

The plurality of fluid-refrigerant heat exchangers 211a and 211b may exchange heat between the high-temperature, high-pressure gaseous refrigerant flowing in the refrigerant flow paths 212a and 212b and the fluid flowing in fluid flow paths 213a and 213b. In this case, the liquid refrigerant may be discharged from the refrigerant flow paths 212a and 212b to flow to the liquid refrigerant flow path 272 by heat exchange in the plurality of fluid-refrigerant heat exchangers 211a and 211b.

The liquid refrigerant flowing in the liquid refrigerant flow path 272 may be supplied to the outdoor unit 100 through the liquid pipe 72. The liquid refrigerant supplied to the outdoor unit 100 may be transferred to the outdoor heat exchangers 151a and 151b, and the outdoor heat exchangers 151a and 151b may exchange heat between the liquid refrigerant and outdoor air. In this case, by heat exchange in the outdoor heat exchangers 151a and 151b, low-pressure gaseous refrigerant may be discharged from the outdoor heat exchangers 151a and 151b to the first connection pipe 171, and the low-pressure gaseous refrigerant may be transferred to the compressors 153 and 154 through the accumulator 152.

The high-temperature fluid heat-exchanged with the high-temperature, high-pressure gaseous refrigerant may be supplied to the first and third indoor units 300a and 300c, and may be heat-exchanged with indoor air in indoor heat exchangers 310a and 310c of the first and third indoor units 300a and 300c. In this case, the air heat-exchanged in the indoor heat exchangers 310a and 310c may be discharged indoors by rotation of indoor fans provided in the first and third indoor units 300a and 300c.

FIG. 4B illustrates an operation state of each component when all the operation modes of the plurality of indoor units 300 are set to a cooling mode and the operation mode of the heat pump 10 is set to the cooling mode. Referring to FIG. 4B, in the heat pump 10, the indoor unit 300 connected to each of the plurality of fluid-refrigerant heat exchangers 211a and 211b may be determined, in consideration of operation loads of the plurality of indoor units 300. For example, among the plurality of indoor units 300, the first indoor unit 300a and the second indoor unit 300b may be connected to the first fluid-refrigerant heat exchanger 211a, and the third indoor unit 300c and the fourth indoor unit 300d may be connected to the second fluid-refrigerant heat exchanger 211b. In addition, depending on the connection relationship between the plurality of fluid-refrigerant heat exchangers 211a and 211b and the plurality of indoor units 300, opening and closing of the supply valves 241aa to 241db and the discharge valves 242a to 242d may be determined.

When the operation mode of the heat pump 10 is set to the cooling mode, the high-temperature, high-pressure gaseous refrigerant compressed and discharged by the compressors 153 and 154 may flow to the first connection pipe 171 through the first and second discharge pipes 155 and 156, the branch joint 157, and the cooling/heating switching valve 162, and may be transferred to the outdoor heat exchangers 151a and 151b through the first connection pipe 171. The outdoor heat exchangers 151a and 151b may exchange heat between the high-temperature, high-pressure gas and outdoor air. In this case, by heat exchange in the outdoor heat exchangers 151a and 151b, the liquid refrigerant may be discharged to the second distribution pipe 194 to flow to the liquid pipe 72.

The liquid refrigerant flowing in the liquid pipe 72 may be supplied to the hybrid unit 200, and the liquid refrigerant supplied to the hybrid unit 200 may be transferred to the refrigerant flow paths 212a and 212b of 211a and 211b of the plurality of fluid-refrigerant heat exchangers 211a and 211b through the liquid refrigerant flow path 272.

The plurality of fluid-refrigerant heat exchangers 211a and 211b may exchange heat between the liquid refrigerant flowing in the refrigerant flow paths 212a and 212b and the fluid flowing in the fluid flow paths 213a and 213b. In this case, the low-pressure gaseous refrigerant may be discharged from the refrigerant flow paths 212a and 212b to flow to the low-pressure gaseous refrigerant flow path 275 by heat exchange in the plurality of fluid-refrigerant heat exchangers 211a and 211b.

The low-pressure gaseous refrigerant flowing in the low-pressure gaseous refrigerant flow path 275 may be supplied to the outdoor unit 100 through the low-pressure gas pipe 75. The low-pressure gaseous refrigerant supplied to the outdoor unit 100 may be transferred to the compressors 153 and 154 through the accumulator 152.

The low-temperature fluid heat-exchanged with the liquid refrigerant may be supplied to the plurality of indoor units 300a to 300d, and may be heat-exchanged with indoor air in indoor heat exchangers 310a to 310d of the plurality of indoor units 300a to 300d. In this case, the air heat-exchanged in the indoor heat exchangers 310a to 310d may be discharged indoors by rotation of indoor fans provided in the plurality of indoor units 300a to 300d.

FIG. 4C illustrates an operation state of each component when some operation modes of the plurality of indoor units 300 are set to the cooling mode, some other operation modes thereof are set to the cooling mode, and the operation mode of the heat pump 10 is set to a cooling/heating mode.

Referring to FIG. 4C, in the heat pump 10, the indoor unit 300 connected to each of the plurality of fluid-refrigerant heat exchangers 211a and 211b may be determined, in consideration of the operation modes of the plurality of indoor units 300. For example, among the plurality of indoor units 300, the first indoor unit 300a and the third indoor unit 300c set to the heating mode may be connected to the first fluid-refrigerant heat exchanger 211a, and the fourth indoor unit 300d set to the cooling mode may be connected to the second fluid-refrigerant heat exchanger 211b. In addition, depending on the connection relationship between the plurality of fluid-refrigerant heat exchangers 211a and 211b and the plurality of indoor units 300, opening and closing of the supply valves 241aa to 241db and the discharge valves 242a to 242d may be determined.

When the operation mode of the heat pump 10 is set to the cooling/heating mode, the high-temperature, high-pressure gaseous refrigerant compressed and discharged by the compressors 153 and 154 may flow to the branch joint 157 through the first and second discharge pipes 155 and 156. In this case, at least some of the high-temperature, high-pressure gaseous refrigerant transferred to the branch joint 157 may flow through the high-pressure gas pipe 63, and some of the remaining high-temperature, high-pressure gaseous refrigerant which is not transferred to the high-pressure gas pipe 63 may flow to the first connection pipe 171 through the cooling/heating switching valve 162.

The high-temperature, high-pressure gaseous refrigerant flowing in the first connection pipe 171 may be transferred to the outdoor heat exchangers 151a and 151b, and may be heat-exchanged with outdoor air in the outdoor heat exchangers 151a and 151b. In this case, by heat exchange in the outdoor heat exchangers 151a and 151b, the liquid refrigerant may be discharged to the second distribution pipe 194 to flow to the liquid pipe 72.

The high-pressure gas valve 221a of the hybrid unit 200 may be opened and the second high-pressure gas valve 221b closed, and the high-temperature, high-pressure gaseous refrigerant supplied from the outdoor unit 100 through the high-pressure gas pipe 63 may be transferred to the refrigerant flow path 212a of the first fluid-refrigerant heat exchanger 211a.

The first fluid-refrigerant heat exchanger 211a may exchange heat between the high-temperature, high-pressure gaseous refrigerant flowing in the refrigerant flow path 212a and the fluid flowing in the fluid flow path 213a. In this case, the liquid refrigerant may be discharged from the refrigerant flow path 212a to flow to the liquid refrigerant flow path 272 by heat exchange in the first fluid-refrigerant heat exchanger 211a.

The liquid refrigerant supplied from the outdoor unit 100 through the liquid pipe 72 may be transferred to the refrigerant flow path 212b of the second fluid-refrigerant heat exchanger 211b together with the liquid refrigerant flowing in the liquid refrigerant flow path 272. The second fluid-refrigerant heat exchangers 211b may exchange heat between the liquid refrigerant flowing in the refrigerant flow path 212b and the fluid flowing in the fluid flow path 213b. In this case, the low-pressure gaseous refrigerant may be discharged from the refrigerant flow path 212b to flow to the low-pressure gaseous refrigerant flow path 275 by heat exchange in the second fluid-refrigerant heat exchanger 211b.

The low-pressure gaseous refrigerant flowing in the low-pressure gaseous refrigerant flow path 275 may be supplied to the outdoor unit 100 through the low-pressure gas pipe 75. The low-pressure gaseous refrigerant supplied to the outdoor unit 100 may be transferred to the compressors 153 and 154 through the accumulator 152.

The high-temperature fluid heat-exchanged in the first fluid-refrigerant heat exchanger 211a may be supplied to the first and third indoor units 300a and 300c. The low-temperature fluid heat-exchanged in the second fluid-refrigerant heat exchanger 211b may be supplied to the fourth indoor unit 300d.

Figure 5:
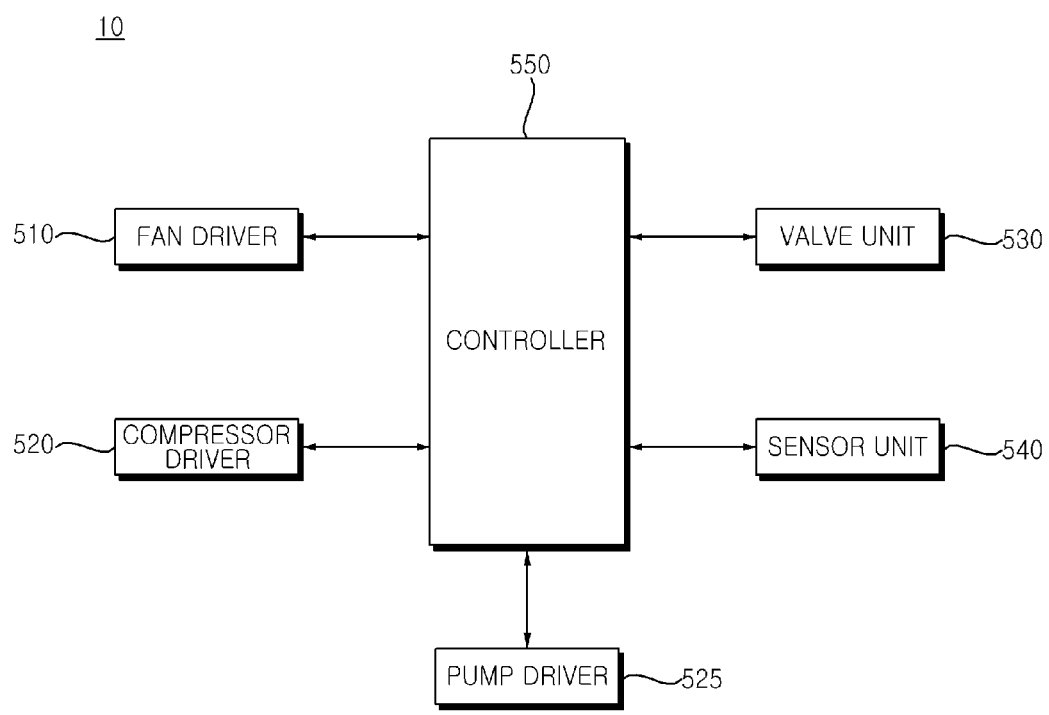
FIG. 5 is a block diagram of a heat pump according to an embodiment.

FIG. 5 is a block diagram of a heat pump according to an embodiment. With reference to the drawing, the description is made based on the configuration of the heat pump 10 shown in FIG. 2; however, embodiments are not limited thereto.

Referring to FIG. 5, the heat pump 10 may include fan driver 510, compressor driver 520, valve unit 530, a sensor unit 540, and/or controller 550. The fan driver 510 may drive at least one fan provided in the heat pump 10. For example, the fan driver 510 may drive outdoor fan 161 provided in the outdoor unit 100 and/or indoor fans provided in the plurality of indoor units 300.

The fan driver 510 may include a rectifier (not shown) that rectifies and outputs alternating current (AC) power to direct current (DC) power, a DC stage capacitor that stores a ripple voltage from the rectifier, an inverter (not shown) that has a plurality of switching elements and converts a smoothed DC power into a three-phase AC power having a predetermined frequency and outputs the converted power supply, and/or a motor (not shown) that drives a fan by the three-phase AC power output from the inverter.

The compressor driver 520 may drive compressors 153 and 154. The compressor driver 520 may include a rectifier (not shown) that rectifies AC power to DC power and outputs the DC power, a DC stage capacitor (not shown), an inverter (not shown), and/or a compressor motor (not shown) that drives the compressors 153 and 154 by the three-phase AC power output from the inverter. When the outdoor unit 200 includes the plurality of compressors 153 and 154, the compressor driver 520 may include respective compressor motors, which correspond to the plurality of compressors 153 and 154, respectively.

The pump driver 525 may drive the pump 251. The pump driver 525 may include a rectifier (not shown) that rectifies AC power to DC power and outputs the DC power, a DC stage capacitor (not shown), an inverter (not shown), and/or a compressor motor (not shown) that drives the pump 251 by the three-phase AC power output from the inverter. When the heat pump 10 includes a plurality of pumps 251a and 251b, the pump driver 525 may include pump motors corresponding to the plurality of pumps 251a and 251b, respectively.

The pump driver 525 may drive the pump 251 based on an input signal for controlling operation of the pump motor transmitted from the controller 550. The input signal may be a switching signal transmitted to an inverter that outputs power to the pump motor. In this case, the switching signal may be a pulse width modulation (PWM) signal having a predetermined duty cycle and frequency.

The valve unit 530 may include various valves provided in the heat pump 10. The valves included in the valve unit 530 may operate under control of the controller 550. For example, the valve unit 530 may include cooling/heating switching valve 162, an expansion valve and an on/off valve, which are provided in the outdoor unit 200, high-pressure gas valve 221, low-pressure gas valve 222, flat pressure valve 223, and refrigerant control valve 231, which are provided in the hybrid unit 200, and the like.

The sensor unit 540 may include at least one sensor and may transmit data on a sensing value sensed through at least one sensor to the controller 550. At least one sensor provided in the sensor unit 540 may be disposed inside or outside of the outdoor unit 100, the hybrid unit 200, and/or the indoor unit 300. For example, the sensor unit 540 may include a heat exchanger temperature sensor disposed in the outdoor heat exchangers 151a and 151b, at least one pressure sensor that detects the pressure of the refrigerant flowing through each pipe, and/or at least one temperature sensor that detects the temperature of the fluid flowing through each pipe, for example.

The sensor unit 540 may include an indoor temperature sensor that detects an indoor temperature and/or an outdoor temperature sensor that detects an outdoor temperature. For example, the outdoor temperature sensor may be disposed in the outdoor unit 100, and the indoor temperature sensor may be disposed in the indoor unit 300.

The controller 550 may be connected to each component provided in the heat pump 10 and may control the overall operation of each component. The controller 550 may transmit and receive data to and from each component provided in the heat pump 10. The controller 550 may be provided not only in the outdoor unit 100, but also in a remote controller (not shown) that remotely controls operation of the hybrid unit 200, the indoor unit 300, and/or the heat pump 10, for example.

The controller 550 may include at least one processor, and may control the overall operation of the heat pump 10 using a processor included therein. The processor may be a general processor, such as a central processing unit (CPU). Of course, the processor may be a dedicated device, such as an application-specific integrated circuit (ASIC) or another hardware-based processor.

The controller 550 may control operation of the fan driver 510. For example, the controller 550 may change a frequency of the three-phase AC power output to the motor to rotate the outdoor fan 161 through operation control of the fan driver 510 to change a rotational speed of the outdoor fan 161.

The controller 550 may control operation of the compressor driver 520. For example, the controller 550 may change the frequency of the three-phase AC power output to the compressor motor to drive the compressors 153 and 154 through operation control of the compressor driver 520, to change an operating frequency of the compressors 153 and 154.

The controller 550 may control the operation of the pump driver 525. For example, the controller 550 may change the frequency of the three-phase AC power output to the pump motor for driving the pump 251 through operation control of the pump driver 525, to change the operating frequency of the pump 251. The controller 550 may change a duty ratio and/or frequency of the PWM signal transmitted to the inverter that outputs the three-phase AC power to the pump motor to change the frequency of the three-phase AC power output to the pump motor.

The controller 550 may calculate power consumption of the pump 251. For example, when data on power consumption is received from the pump 251, the controller 550 may calculate the power consumption of the pump 251 based on the received data.

The controller 550 may calculate the power consumption of the pump 251 based on current flowing through the pump 251. For example, the heat pump 10 may include a current detector (not shown) that detects a current flowing through the pump motor, and the controller 550 may calculate the power consumption of the pump 251 based on the current flowing through the pump motor detected by the current detector. In this case, the current detector may include a shunt resistor connected to an output terminal of the pump motor, and an amplifier that amplifies a voltage applied to the shunt resistor, for example.

The controller 550 may calculate the flow rate of fluid flowing due to the pump 251 based on the power consumption of the pump 251. That is, the controller 550 may calculate the flow rate of fluid discharged from the indoor heat exchangers 310*a* and 310*b* and flowing to the fluid-refrigerant heat exchanger 211 by the operation of the pump 251, based on the power consumption of the pump 251.

For example, the controller 550 may be configured to calculate the flow rate of fluid based on an input signal for controlling an operation of the motor and a pre-stored look-up table for the power consumption of the pump 251. In this regard, a description will be made with reference to FIG. 6.

Figure 6:
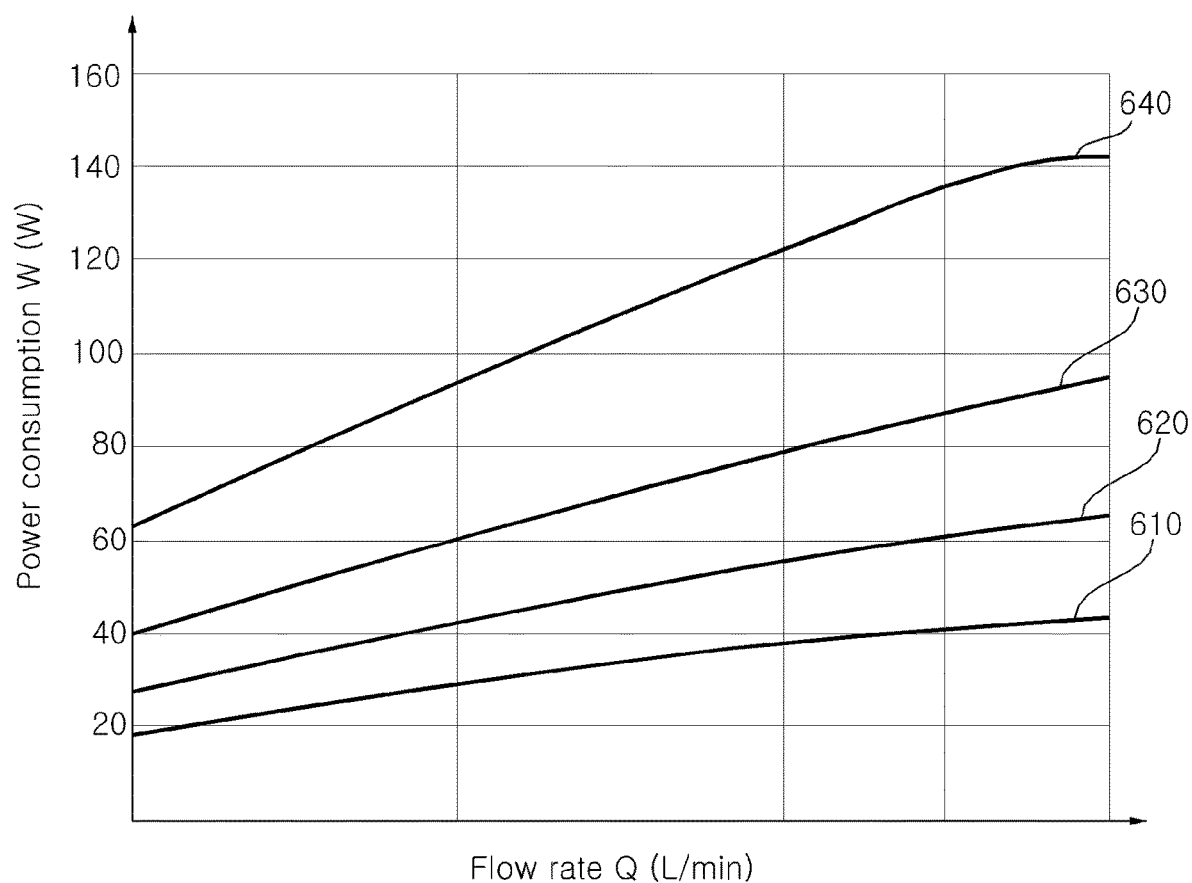
FIGS. 6 and 7 are diagrams describing operation of a heat pump according to an embodiment.

FIG. 6 is a graph of flow rate of a fluid, such as water flowing in the pipe in which the pump 251 is disposed and power consumption of the pump 251. First to fourth graphs 610 to 640 of FIG. 6 show flow rate of fluid vs the power consumption of the pump 251 in the order of smallest operating frequency of the pump 251 to greatest operating frequency thereof.

Referring to FIG. 6, it can be seen that as the flow rate of fluid flowing through the pipe increases, the power consumption of the pump 251 increases, and it can be seen that a relationship between the flow rate of fluid and the power consumption of the pump 251 is linear. In addition, it can be seen that as the operating frequency of the pump 251 increases according to an input signal, for example, a PMW signal, for controlling the operation of the pump motor, the power consumption of the pump 251 increases at the same flow rate. Therefore, the controller 550 may calculate the flow rate of fluid based on the look-up table based on graphs of the flow rate of fluid vs the power consumption of the pump 251, as illustrated in FIG. 6. The controller 550 may stop operation of the pump 251 by controlling the pump driver 525 when the calculated flow rate of fluid is less than a preset or predetermined reference flow rate.

The controller 550 may calculate an average and standard deviation of the power consumption of the pump 251 calculated for a predetermined period of time. The controller 550 may determine the ratio of fluid to air (hereinafter, air ratio) flowing in the pipe connected to the pump 251 based on the average and standard deviation of the power consumption of the pump 251. For example, when only fluid flows through the pipe connected to the pump 251, the air ratio may be 0%, and when only air flows through the pipe connected to the pump 251, the air ratio may be 100%. In this regard, a description will be made with reference to FIG. 7.

Figure 7:
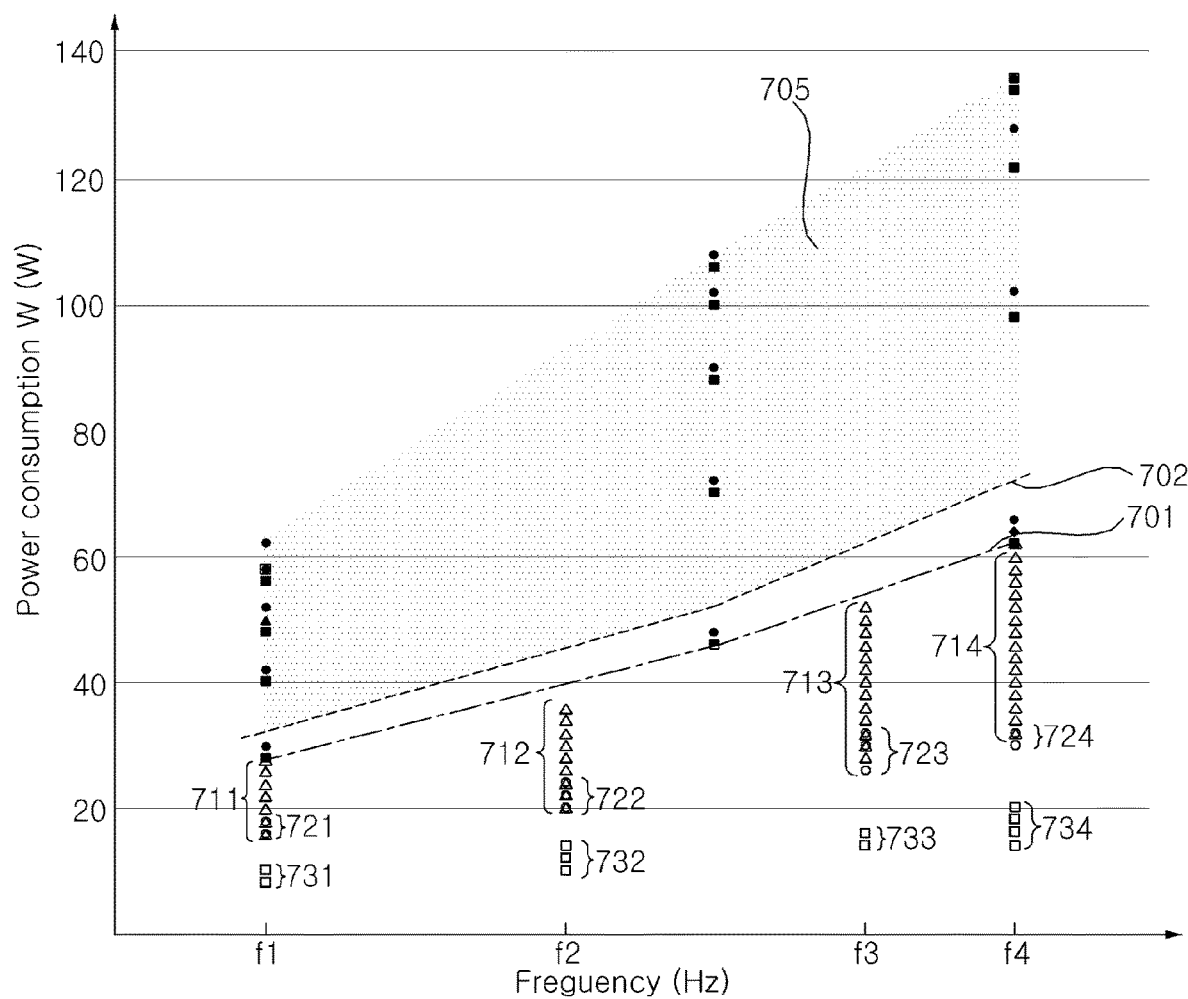

FIG. 7 is a graph of power consumption of the pump 251 with respect to the ratio of air flowing in the pipe connected to the pump 251.

Reference numeral 701 denotes power consumption of the pump 251 based on operating frequency of the pump 251 when the air ratio is 0% and the flow rate of fluid flowing in the pipe connected to the pump 251 is a minimum. For example, reference numeral 701 may be the power consumption of the pump 251 calculated when supply valves 241*a* and 241*b* and discharge valves 242*a* and 242*b* are all closed.

Reference numeral 702 denotes power consumption of the pump 251 based on the operating frequency of the pump 251 when the air ratio is 0% and the flow rate of fluid flowing in the pipe connected to the pump 251 is a preset or predetermined reference flow rate, for example, 7 LPM. Reference numeral 705 denotes a region in which power consumption of the pump 251 is calculated depending on the flow rate of fluid when the air ratio is 0% and the flow rate of fluid flowing in the pipe connected to the pump 251 is equal to or greater than the preset or predetermined reference flow rate, for example, 7 LPM, and the higher the flow rate of fluid, the higher the power consumption of the pump 251 may be calculated.

Reference numerals 711 to 714 denote power consumption of the pump 251 calculated when the air ratio is 10%, reference numerals 721 to 724 denote power consumption of the pump 251 calculated when the air ratio is 50%, and reference numerals 731 to 734 denote power consumption of the pump 251 calculated when the air ratio is 100%. In this case, it is assumed that the flow rate of fluid in reference numerals 711 to 734 is constant and the flow rate is equal to or higher than preset or predetermined reference flow rate, for example, 7 LPM.

Referring to FIG. 7, it can be seen that averages of respective power consumptions of the pump 251 calculated when the air ratio is 10%, 50%, and 100% are all lower than the power consumption 701 of the pump 251 calculated when the flow rate of fluid is minimum in a state in which the air ratio is 0%. In addition, it can be seen that as the air ratio increases, the average of the power consumption of the pump 251 decreases. This means that when the air ratio increases and air flows through the pipe even if the flow rate of fluid is maintained at a certain level, idle rotation is generated in the impeller of the pump 251, and thus, power consumption of the pump 251 is calculated to be low.

It can be seen that when the air ratio is 10%, the standard deviation of the power consumption of the pump 251 is large even though the flow rate of fluid is kept constant. This means that the power consumption of the pump 251 is calculated above a certain level as the impeller of the pump 251 rotates normally while fluid flows through the pipe, but the power consumption of the pump 251 is calculated to be relatively low as idle rotation occurs in the impeller of the pump 251 while air flows through the pipe.

It can be seen that when the air ratio is 50% or 100%, the dispersion of power consumption of the pump 251 is smaller than when the air ratio is 10%. For example, when the operating frequency of the pump 251 is f4, the average and the standard deviation of the power consumption of the pump 251 is 52 W and 8 W, respectively, when the air ratio is 10% (714); whereas the average and the standard deviation of the power consumption of the pump 251 may be calculated as 30 W and 1 W, respectively, when the air ratio is 50% (724). This means that when the air ratio is larger than a certain level, for example, 50%, the power consumption of the pump 251 is more often calculated to be low as the flow of air becomes more frequent than the flow of fluid, and dispersion of the power consumption of the pump 251 becomes smaller again accordingly.

Therefore, the controller 550 may determine the air ratio to the pipe connected to the pump 251, based on the average and dispersion of the power consumption of the pump 251 as the result as shown in FIG. 7. The controller 550 may determine that the air ratio is less than a first ratio when the average of the power consumption of the pump 251 is equal to or greater than a preset or predetermined average. The first ratio may be a maximum value. for example, 3%, of an air ratio at which surging, for example, does not occur and the heat pump 10 may operate normally.

The preset average may be an average of power consumption calculated when the air ratio is the first ratio, for example, 3%, and may be determined depending on an input signal for controlling the operation of the pump motor. For example, as the input signal for controlling the operation of the pump motor, that is, the operating frequency of the pump 251 increases, the preset average may increase.

The controller 550 may be configured to determine that the air ratio is equal to or greater than the first ratio, for example, 3%, or more and less than a second ratio, for example, 30%, when the average of the power consumption of the pump 251 is less than the preset average and the standard deviation of the power consumption is equal to or greater than a preset or predetermined standard deviation. The preset or predetermined standard deviation may be a standard deviation of power consumption calculated when the air ratio is the first ratio, for example, 3%, and may be determined depending on the input signal for controlling the operation of the pump motor. For example, as the input signal for controlling the operation of the pump motor, that is, the operating frequency of the pump 251 increases, the preset standard deviation may increase.

The second ratio is the air ratio, for example, 30%, when the standard deviation of the power consumption of the pump 251 is calculated as a preset standard deviation, excluding the first ratio, for example, 3%. The controller 550 may determine that the air ratio is equal to or greater than the second ratio, for example, 30%, when the average of the power consumption of the pump 251 is less than the preset average and the standard deviation of the power consumption is less than the preset standard deviation. In this case, the controller 550 may determine that the air ratio increases as the average of the power consumption of the pump 251 decreases. The controller 550 may control the pump driver 525 to stop operation of the pump 251, when the air ratio to the pipe connected to the pump 251 is the first ratio, for example, 3%, or more.

The heat pump 10 may further include an output unit (not shown). The output unit may include a display device, such as a display and a light emitting diode (LED), and may display a message regarding the operation of the heat pump 10 through the display device. The output unit may include an audio device, such as a speaker or a buzzer, and may output a warning sound through the audio device.

For example, the controller 550 may output an error message through the output unit, when at least one of the supply valves 241a and 241b and the discharge valves 242a and 242b is opened and the flow rate of fluid flowing through the pipe is less than the preset reference flow rate, and/or when the air ratio is equal to or greater than the first ratio, for example, 3%, and the operation of the pump 251 is stopped. In this case, the error message may include information on the air ratio.

Figure 8:
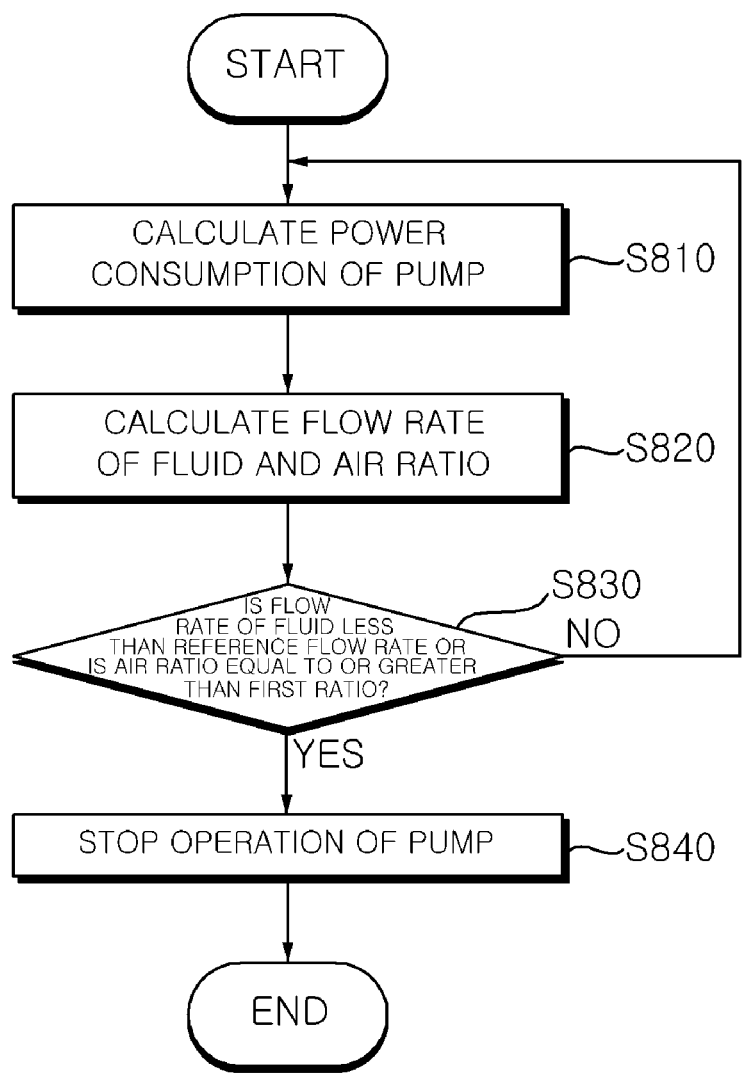
FIG. 8 is a flowchart of a method for operating a heat pump according to an embodiment.

FIG. 8 is a flowchart of a method for operating a heat pump according to an embodiment. Referring to FIG. 8, the heat pump 10 may calculate power consumption of the pump 251 in operation S810. For example, the heat pump 10 may calculate the power consumption of the pump 251 based on the data on the power consumption of the pump 251 and/or the current flowing through the pump motor detected through the shunt resistor.

In operation S820, the heat pump 10 may calculate the air ratio, which is the ratio of fluid to air flowing in the pipe connected to the pump 251 and the flow rate of fluid flowing by the pump 251, based on the power consumption of the pump 251. For example, the heat pump 10 may calculate the flow rate of fluid based on the look-up table based on the graph of the flow rate of fluid vs the power consumption of the pump 251. For example, the heat pump 10 may calculate the air ratio based on the average and the standard deviation of the power consumption of the pump 251 calculated for a predetermined period of time.

In operation S830, the heat pump 10 may determine whether the flow rate of fluid is less than a preset or predetermined reference flow rate, for example, 7 LPM, and whether the air ratio is equal to or greater than the preset first ratio, for example, 3%. In operation S840, the heat pump 10 may stop the pump 251 when the flow rate of fluid is less than the preset reference flow rate, for example, 7 LPM, or when the air ratio is equal to or greater than the preset first ratio, for example, 3%. In addition, the heat pump 10 may output an error message including information on the air ratio through the output unit.

When the flow rate of fluid is equal to or greater than the preset reference flow rate, for example, 7 LPM, and the air ratio is less than the preset first ratio, for example, 3%, the heat pump 10 may repeatedly perform the operation of calculating the power consumption of the pump 251 and calculating the flow rate of fluid and the air ratio by branching to operation S610.

As described above, according to embodiments, it is possible to calculate the flow rate of fluid flowing through a pipe based on the power consumption of the pump 251 without a separate sensor, thereby making it possible to improve price competitiveness by reducing production costs. In addition, according to embodiments, it is possible to calculate the ratio of fluid to air flowing in the pipe connected to the fluid pump 251 based on the average and standard deviation of the power consumption of the pump 251. In addition, according to embodiments, it is possible to prevent occurrence of surging, for example, by controlling the operation of the pump 251 based on the flow rate of fluid flowing through the pipe connected to the pump 251 or the ratio of fluid to air, thereby making it possible to improve reliability and safety of the product.

Embodiments disclosed herein provide a heat pump capable of calculating a flow rate of a fluid, such as water flowing through a pipe without a separate sensor, and a method for operating a heat pump. Second, embodiments disclosed herein provide a heat pump capable of calculating a ratio of a fluid, such as water to air flowing through a pipe and a method for operating a heat pump. Third, embodiments disclosed herein provide a heat pump capable of preventing the occurrence of surging, for example, by controlling operation of a pump depending on a flow rate of water flowing through a pipe or a ratio of a fluid, such as water to air, and a method for operating a heat pump.

The problems to be solved are not limited to the above-mentioned problems, and other problems not mentioned will be apparent to those skilled in the art upon reading the description.

Embodiments disclosed herein provide a heat pump capable of calculating a flow rate of a fluid, such as water flowing by a pump based on power consumption of the pump and controlling an operation of the pump according to the flow rate of fluid.

A heat pump according to embodiments disclosed herein is provided. The heat pump may include a compressor that compresses a refrigerant, a fluid-refrigerant heat exchanger that exchanges heat between the refrigerant and a fluid, such as water, a pump including a motor and forcing the fluid to flow into the fluid-refrigerant heat exchanger, and a controller. The controller may be configured to calculate power consumption of the pump, calculate a flow rate of fluid flowing by the pump based on the calculated power consumption, and control an operation of the pump to be stopped when the flow rate of the fluid is less than a preset or predetermined reference flow rate.

The heat pump may further include a shunt resistor connected to an output terminal of the motor. The controller may be configured to calculate the power consumption of the pump based on a voltage applied to the shunt resistor by a current flowing through the motor. Further, the controller may be configured to calculate the flow rate of the fluid based on an input signal for controlling an operation of the motor and a look-up table for the power consumption of the pump. Furthermore, the controller may be configured to calculate an average and a standard deviation of the power consumption calculated for a predetermined period of time, and determine a ratio of fluid to air flowing a pipe connected to the pump based on the average and the standard deviation of the power consumption.

The controller may be configured to determine that the ratio of fluid to air is less than a first ratio when the average of the power consumption is equal to or greater than a preset or predetermined average. Further, the controller may be configured to determine that the ratio of fluid to air is equal to or greater than the first ratio or more and less than a second ratio when the average of the power consumption is less than the preset average and the standard deviation of the power consumption is equal to or greater than a preset standard deviation. The controller may be configured to determine that the ratio of fluid to air is equal to or greater than the second ratio when the average of the power consumption is less than the preset average and the standard deviation of the power consumption is less than the preset standard deviation. The controller may be configured to determine that the ratio of fluid to air increases as the average of the power consumption decreases, when the average of the power consumption is less than the preset average and the standard deviation of the power consumption is less than the preset standard deviation.

The controller may be configured to control operation of the pump to be stopped when the ratio of fluid to air is equal to or greater than the first ratio. The preset average and the preset standard deviation may be determined depending on the input signal for controlling the operation of the motor.

Embodiments disclosed herein provide a method for operating a heat pump. The operation method may include calculating power consumption of a pump that forces a fluid, such as water to flow into a fluid-refrigerant heat exchanger that exchanges heat between a refrigerant and fluid, calculating a flow rate of fluid flowing by the pump based on the calculated power consumption, and stopping an operation of the pump to be stopped when the calculated flow rate is less than a preset or predetermined reference flow rate.

According to embodiments, it is possible to calculate the flow rate of fluid flowing through a pipe based on power consumption of the pump without a separate sensor, thereby making it possible to improve price competitiveness by reducing production costs. Further, according to embodiments, it is possible to calculate the ratio of fluid to air flowing through the pipe based on the average and standard deviation of the power consumption of the pump. Also, according to embodiments, it is possible to prevent occurrence of surging, for example, by controlling operation of the pump based on the flow rate of fluid flowing through the pipe or the ratio of fluid to air, thereby making it possible to improve reliability and safety of the product.

A further scope of applicability will become apparent from the description. However, various changes and modifications made within the spirit and scope could be clearly understood by those skilled in the art, and thus, it should be understood that the detailed description and specific embodiments are given by way of example only.

The accompanying drawings are merely intended to make easily understood embodiments disclosed in this specification, and the technical spirit disclosed in this specification is not restricted by the accompanying drawings and includes all modifications, equivalents, and substitutions which fall within the spirit and technological scope.

Similarly, while operations are depicted in a particular order, this should not be understood as requiring that such operations be performed in the particular order shown or in sequential order, or that all illustrated operations be performed in order to achieve desirable results. In certain circumstances, multitasking and parallel processing may be advantageous.

It will be apparent that, although embodiments have been illustrated and described above, the embodiments are not limited to the above-described embodiments, and various modifications may be made by those skilled in the art without departing from the gist as claimed in the appended claims. The modifications should not be understood separately from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heat pump, comprising:
    a compressor that compresses a refrigerant;
    at least one fluid-refrigerant heat exchanger that exchanges heat between the refrigerant and a fluid;
    a pump including a motor, the pump forcing the fluid to flow into the at least one fluid-refrigerant heat exchanger; and
    a controller configured to:
        calculate power consumption of the pump;
        calculate a flow rate of the fluid flowing due to the pump based on the calculated power consumption;
        calculate an average and a standard deviation of the power consumption calculated for a predetermined period of time;
        determine a ratio of fluid that is a liquid to air flowing through a pipe connected to the pump based on the average and the standard deviation of the power consumption; and
        control an operation of the pump to be stopped based on at least one of a case where the flow rate of the fluid is less than a predetermined reference flow rate or a case where the determined ratio is equal to or greater than a predetermined ratio.

2. The heat pump of claim 1, further comprising a shunt resistor connected to an output terminal of the motor, wherein the controller is configured to calculate the power consumption of the pump based on a voltage applied to the shunt resistor by a current flowing through the motor.

3. The heat pump of claim 2, wherein the controller is configured to calculate the flow rate of the fluid based on an input signal for controlling an operation of the motor and a look-up table for the power consumption of the pump.

4. The heat pump of claim 1, wherein the controller is configured to determine that the ratio of fluid to air is less than a first ratio when the average of the power consumption is equal to or greater than a predetermined average.

5. The heat pump of claim 4, wherein the controller is configured to determine that the ratio of fluid to air is equal to or greater than the first ratio or more and less than a second ratio when the average of the power consumption is less than the predetermined average and the standard deviation of the power consumption is equal to or greater than a predetermined standard deviation.

6. The heat pump of claim 5, wherein the controller is configured to determine that the ratio of fluid to air is equal to or greater than the second ratio when the average of the power consumption is less than the predetermined average and the standard deviation of the power consumption is less than the predetermined standard deviation.

7. The heat pump of claim 6, wherein the controller is configured to determine that the ratio of fluid to air increases as the average of the power consumption decreases, when the average of the power consumption is less than the predetermined average and the standard deviation of the power consumption is less than the predetermined standard deviation.

8. The heat pump of claim 7, wherein the controller is configured to control the operation of the pump to be stopped when the ratio of fluid to air is equal to or greater than the first ratio.

9. The heat pump of claim 8, wherein the predetermined average and the predetermined standard deviation are determined depending on the input signal for controlling the operation of the motor.

10. A method for operating a heat pump, comprising:
    calculating via a controller power consumption of a pump forcing fluid to flow into at least one fluid-refrigerant heat exchanger that exchanges heat between a refrigerant and a fluid;
    calculating via the controller a flow rate of the fluid flowing due to the pump based on the calculated power consumption;
    calculating via the controller an average and a standard deviation of the power consumption calculated for a predetermined period of time;
    determining via the controller a ratio of fluid that is a liquid to air flowing through a pipe connected to the pump based on the average and the standard deviation of the power consumption; and
    stopping via the controller an operation of the pump based on at least one of a case where the calculated flow rate is less than a predetermined reference flow rate or a case where the determined ratio is equal to or greater than a predetermined ratio.

11. The method of claim 10, wherein the heat pump comprises a shunt resistor connected to an output terminal of a motor of the pump, wherein the calculating of the power consumption of the pump comprises calculating the power consumption of the pump based on a voltage applied to the shunt resistor by a current flowing through the motor.

12. The method of claim 11, wherein the calculating of the flow rate of the fluid comprises calculating the flow rate of the fluid based on an input signal for controlling an operation of the motor and a look-up table for the power consumption of the pump.

13. The method of claim 10, wherein the ratio of fluid to air is determined to be less than a first ratio when the average of the power consumption is equal to or greater than a predetermined average.

14. The method of claim 13, wherein the ratio of fluid to air is determined to be equal to or greater than the first ratio or more and less than a second ratio when the average of the power consumption is less than the predetermined average and the standard deviation of the power consumption is equal to or greater than a predetermined standard deviation.

15. The method of claim 14, wherein the ratio of fluid to air is determined to be equal to or greater than the second ratio when the average of the power consumption is less than the predetermined average and the standard deviation of the power consumption is less than the predetermined standard deviation.

16. The method of claim 15, wherein the ratio of fluid to air is determined to be increasing as the average of the power consumption decreases, when the average of the power consumption is less than the predetermined average and the standard deviation of the power consumption is less than the predetermined standard deviation.

17. The method of claim 16, further comprising:
stopping via the controller the operation of the pump when the ratio of fluid to air is equal to or greater than the first ratio.

18. The method of claim 17, wherein the predetermined average and the predetermined standard deviation are determined depending on the input signal for controlling the operation of the motor.

* * * * *